United States Patent
Chen et al.

(10) Patent No.: US 11,401,404 B2
(45) Date of Patent: Aug. 2, 2022

(54) METHOD FOR PREPARING POLYOLEFIN-ACRYLIC PARTICLES

(71) Applicants: Dow Global Technologies LLC, Midland, MI (US); Rohm and Haas Company, Collegeville, PA (US)

(72) Inventors: Liang Chen, Sewickley, PA (US); Andy Jun Li, Sugar Land, TX (US); Matthew Carter, Bala Cynwyd, PA (US); Robert S. Moglia, Midland, MI (US); Ralph C. Even, Blue Bell, PA (US); Miroslav Janco, Warrington, PA (US); Carlos A. Cruz, Collegeville, PA (US); Yannick Saint-Gerard, Roquefort-les-Pins (FR)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/765,338

(22) PCT Filed: Nov. 29, 2018

(86) PCT No.: PCT/US2018/062993
§ 371 (c)(1),
(2) Date: May 19, 2020

(87) PCT Pub. No.: WO2019/133168
PCT Pub. Date: Jul. 4, 2019

(65) Prior Publication Data
US 2020/0354553 A1 Nov. 12, 2020

(30) Foreign Application Priority Data
Dec. 29, 2017 (EP) .................... 17290170

(51) Int. Cl.
*C08L 23/08* (2006.01)
(52) U.S. Cl.
CPC ............... *C08L 23/0815* (2013.01)
(58) Field of Classification Search
CPC .... C08F 210/00; C08F 210/02; C08F 210/04; C08F 210/16; C08F 285/00; C08L 23/0815
See application file for complete search history.

(56) References Cited

U.S. PATENT DOCUMENTS

| | | | |
|---|---|---|---|
| 5,039,741 A * | 8/1991 | Burg | C08L 59/02 525/64 |
| 6,730,734 B1 | 5/2004 | Hamilton et al. | |
| 2011/0086564 A1 | 4/2011 | Chou et al. | |
| 2016/0168368 A1 | 6/2016 | Chen et al. | |
| 2016/0177077 A1 | 6/2016 | Nelliappan | |

FOREIGN PATENT DOCUMENTS

| | | |
|---|---|---|
| CA | 2519078 | 9/2004 |
| JP | 2002256037 | 9/2002 |
| KR | 2017054642 | 5/2017 |
| RU | 2432367 C2 | 7/2010 |
| WO | 2009082640 | 7/2009 |

* cited by examiner

*Primary Examiner* — Mark S Kaucher
(74) *Attorney, Agent, or Firm* — Brian L. Mutschler

(57) ABSTRACT

Provided is a process for making a dispersion of composite particles comprising
(i) providing a dispersion of crosslinked polyolefin particles in an aqueous medium,
(ii) performing emulsion polymerization on one or more vinyl monomers in the presence of the crosslinked polyolefin particles to produce the dispersion of composite particles.

9 Claims, No Drawings

METHOD FOR PREPARING POLYOLEFIN-ACRYLIC PARTICLES

Particles that contain polyolefin are useful for a variety of purposes. For example, composite particles may be formed in which a full or partial shell of (meth)acrylic polymer resides on a polyolefin core. Such composite particles may be used as additives to matrix polymers such as polycarbonate, to improve the impact resistance or other properties.

US 2016/0177077 describes composite polymer compositions comprising the emulsion polymerization product of an aqueous polyolefin dispersion and one or more (meth) acrylic monomers. It is desired to provide improved polyolefin particles and to provide a process for making improved polyolefin particles, so that when a shell of (meth)acrylate polymer is formed on the improved polyolefin particles, and the resulting composite particles are added to a matrix polymer such as, for example, polycarbonate, to form compounded matrix polymer, one or more of the following benefits is obtained: the impact resistance of the polycarbonate is improved; the compounded matrix polymer has melt flow characteristics similar to the original matrix polymer, as measured by the melt flow rate; the compounded matrix polymer, including the added polyolefin particles, resists weathering well; and/or molded parts made from matrix polymer compounds have few or no surface defects (such as, for example, delamination).

The following is a statement of the invention.

A first aspect of the present invention is a method of making a polymeric composition comprising
  (a) providing a dispersion of initial polyolefin particles in an aqueous medium, wherein the initial polyolefin particles comprise
    (i) one or more hydrocarbon polyolefin,
    (ii) one or more non-hydrocarbon polyolefin, and
    (iii) one or more crosslinking agent;
  (b) contacting the initial polyolefin particles with a peroxide initiator to form crosslinked polyolefin particles.

A second aspect of the present invention is a process for making a dispersion of composite particles comprising
  (i) providing a dispersion of crosslinked polyolefin particles in an aqueous medium,
  (ii) performing emulsion polymerization on one or more vinyl monomers in the presence of the crosslinked polyolefin particles to produce the dispersion of composite particles.

A third aspect of the present invention is a dispersion of composite particles in an aqueous medium, wherein the composite particles comprise
  (I) a crosslinked polyolefin core, and
  (II) a full or partial shell comprising polymerized units of one of more vinyl monomers.

A fourth aspect of the present invention is a method of modifying polycarbonate comprising blending the polycarbonate with composite particles, wherein the composite particles comprise
  (I) a crosslinked polyolefin core, and
  (II) a full or partial shell comprising polymerized units of one of more vinyl monomers.

The following is a detailed description of the invention.

As used herein, the following terms have the designated definitions, unless the context clearly indicates otherwise.

A hydrocarbon is a compound containing only atoms of hydrogen and carbon. An atom other than carbon and hydrogen is a "hetero" atom. A chemical group that contains one or more hetero atom is a "hetero" group.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 1,000 daltons or higher. Polymers that are sufficiently crosslinked that they become insoluble in any solvent are considered to have infinite molecular weight.

Molecules that can react with each other to form the repeat units of a polymer are known herein as "monomers." The repeat units so formed are known herein as "polymerized units" of the monomer.

Vinyl monomers have the structure

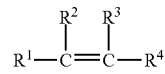

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

An olefin monomer is a monomer that is a hydrocarbon having one or more carbon-carbon double bond and having no aromatic rings.

Vinyl monomers that are hydrocarbons are olefin monomers. A polymer having more than 50% by weight polymerized units of olefin monomers is a polyolefin. Vinyl aromatic monomers are vinyl monomers in which one or more of $R^1$, $R^2$, $R^3$, and $R^4$ contains one or more aromatic rings. (Meth)acrylate means acrylate or methacrylate. (Meth)acrylic means acrylic or methacrylic. (Meth)acrylic monomers are monomers selected from acrylic acid, methacrylic acid, alkyl esters thereof, substituted-alkyl esters thereof, amides thereof, N-substituted amides thereof, acrylonitrile, methacrylonitrile, and mixtures thereof. Substituents may be, for example, hydroxyl groups, alkyl groups, aromatic groups, groups containing non-aromatic carbon-carbon double bonds, or other groups, or combinations thereof. A (meth)acrylic polymer is a polymer having more than 50% by weight polymerized units of (meth)acrylic monomers.

An alpha-olefin is a hydrocarbon having 3 or more carbon atoms and having exactly one carbon-carbon double bond, which is located at a terminal carbon atom. That is, in an alpha-olefin, at least one of the two carbon atoms in the carbon-carbon double bond also has two hydrogen atoms attached. A diene is a hydrocarbon having exactly two carbon-carbon double bonds. A diene may be conjugated or non-conjugated.

A polyolefin that is made exclusively of hydrocarbon monomers is considered to be a hydrocarbon, even if a small number of hetero groups is attached to the polyolefin, as fragments from an initiator and/or chain transfer agent. In hydrocarbon polyolefins, the mole ratio of hetero atoms to polymerized units of all monomers is 0.001:1 or lower. A polyolefin that is not a hydrocarbon is a non-hydrocarbon polyolefin.

As used herein, a crosslinking agent is a compound having two or more carbon-carbon double bonds.

A dispersion is a collection of particles that are distributed throughout a continuous liquid medium. A continuous liquid medium is an aqueous medium if the liquid medium is 50% or more water by weight based on the weight of the liquid medium. A dispersion has "solids" content that is determined by weighing the dispersion (WDISP), then drying the dispersion in an infrared moisture balance at 150° C. until the weight is stable, then determining the weight of the dry residue (WDRY), and then solids=100*WDRY/WDISP.

A compound is said herein to be water soluble if the amount of the compound that may be dissolved in 100 g of water at 23° C. is 5 grams or more.

An initiator is a compound that, when exposed to initiation conditions, produces radical moieties that are capable of initiating free-radical polymerization. The nature of the initiation condition varies among initiators. Some examples: thermal initiators produce radical moieties when heated to a sufficiently high temperature; and photoinitiators produce radical moieties when exposed to radiation of sufficiently short wavelength and sufficiently high intensity. As another example, a redox initiator is a pair of molecules that react together in an oxidation/reduction reaction to produce radical moieties; initiation conditions obtain when both members of the pair are present and can react with each other.

Emulsion polymerization is a process in which monomer emulsion droplets, water-soluble initiator, and optional seed particles are present in an aqueous medium. During emulsion polymerization, monomer molecules transfer from the monomer emulsion droplets to the particles where polymerization takes place, which may be separate particles formed during polymerization or may be the seed particles, or a combination thereof.

Polymers may be characterized by their glass transition temperature (Tg), which is measured by differential scanning calorimetry (DSC), at a scan rate of 10° C./min, using the inflection point method.

A collection of particles may be characterized by the volume mean diameter.

Ratios are characterized herein as follows. For example, if a ratio is said to be 5:1 or higher, it is meant that the ratio may be 5:1 or 6:1 or 100:1 but may not be 4:1. To state this characterization in a general way, if a ratio is said to be X:1 or higher, then the ratio is Y:1, where Y is greater than or equal to X. Similarly, for example, if a ratio is said to be 2:1 or lower, it is meant that the ratio may be 2:1 or 1:1 or 0.001:1 but may not be 3:1. To state this characterization in a general way, if a ratio is said to be Z:1 or lower, then the ratio is W:1, where W is less than or equal to Z.

The present invention involves the use of a dispersion of "initial" polyolefin particles. The label "initial" distinguishes the polyolefin particles from various polyolefin particles that are formed as a result of operations performed on the initial polyolefin particles. Preferably, the solids of the dispersion of initial polyolefin particles is 70% or less; more preferably 60% or less. Preferably, the solids of the dispersion of initial polyolefin particles is 40% or more; more preferably 50% or more.

Preferably, the amount of water in the aqueous medium, by weight based on the weight of the aqueous medium, is 60% or more; more preferably 70% or more; more preferably 80% or more; more preferably 90% or more.

Preferably, the volume average particle diameter of the dispersion of initial polyolefin particles is 100 nm or larger; more preferably 150 nm or larger; more preferably 200 nm or larger; more preferably 250 nm or larger. Preferably, the volume average particle diameter of the dispersion of initial polyolefin particles is 2000 nm or smaller; more preferably 1000 nm or smaller; more preferably 750 nm or smaller; more preferably 500 nm or smaller.

The amount of total polyolefin in the initial polyolefin particles is, by weight based on the total solid weight of the dispersion, preferably 50% or more; more preferably 60% or more; more preferably 70% or more; more preferably 80% or more. The amount of total polyolefin polymer in the initial polyolefin particles is, by weight based on the total solid weight of the dispersion, preferably 98% or less; more preferably 96% or less. Initial polyolefin particles preferably contain one or more hydrocarbon polyolefin and one or more non-hydrocarbon polyolefin.

The initial polyolefin particles preferably have Tg of 50° C. or lower; more preferably 30° C. or lower; more preferably 15° C. or lower; more preferably 0° C. or lower; more preferably −15° C. or lower.

Examples of hydrocarbon polyolefins include, but are not limited to, homopolymers and copolymers (including elastomers) of monomers chosen from ethylene and one or more alpha-olefins. Examples of alpha-olefins include propylene, 1-butene, 3-methyl-1-butene, 4-methyl-1-pentene, 3-methyl-1-pentene, 1-heptene, 1-hexene, 1-octene, 1-decene, and 1-dodecene. Further examples of hydrocarbon polyolefins include copolymers (including elastomers) of one or more dienes with ethylene, with one or more alpha-olefins, or with a combination thereof. Examples of dienes include butadiene; dicyclopentadiene; 1,5-hexadiene; ethylidene norbornene; and vinyl norbornene.

Preferred hydrocarbon polyolefins are copolymers of two or more alpha-olefins and copolymers of ethylene with one or more alpha-olefins. More preferred are copolymers of ethylene with one or more alpha-olefins. Among copolymers of ethylene with one or more alpha-olefins, preferably an alpha-olefin is used that has 5 or more carbon atoms, more preferably 6 or more carbon atoms; more preferably 7 or more carbon atoms; more preferably 8 or more carbon atoms. Among copolymers of ethylene with one or more alpha-olefins, preferably an alpha-olefin is used that has 12 or fewer carbon atoms; more preferably 10 or fewer carbon atoms; more preferably 9 or fewer carbon atoms; more preferably 8 or fewer carbon atoms.

Polyolefins that are copolymers may be statistical copolymers, block copolymers, graft copolymers, copolymers having other structure, or mixtures thereof. Preferred are statistical copolymers.

Some suitable hydrocarbon polyolefins are commercially available from The Dow Chemical Company, under the tradename VERSIFY™, NORDEL™, or ENGAGE™; or from ExxonMobil Chemical Company, under the tradename VISTAMAXX™, VISTALON™, or EXACT™.

Some suitable hydrocarbon polyolefins are copolymers of one or more olefin monomers with one or more vinyl aromatic monomers. Among such copolymers are, for example, copolymers of ethylene and styrene and block copolymers of styrene-olefin monomer(s)-styrene, including, for example, styrene-butadiene-styrene, styrene-isoprene-styrene, styrene-isoprene-butadiene-styrene, and the hydrogenated versions of these block copolymers, including styrene-ethylene-butylene-styrene, styrene-ethylene-propylene-styrene, and styrene-ethylene-ethylene-propylene-styrene.

The amount of hydrocarbon polyolefin in the initial polyolefin particles is, by weight based on the total solid weight of the dispersion of initial polyolefin particles, preferably 50% or more; more preferably 60% or more; more preferably 65% or more. The amount of hydrocarbon polyolefin in the initial polyolefin particles is, by weight based on the total solid weight of the dispersion of initial polyolefin particles, preferably 95% or less; more preferably 90% or less; more preferably 85% or less.

The initial polyolefin particles preferably contain one or more non-hydrocarbon polyolefin. Non-hydrocarbon polyolefins contain one or more hetero group (as defined above). The hetero group may have been attached to a comonomer prior to polymerization or may have been added to the polyolefin by grafting after polymerization.

Examples of non-hydrocarbon polyolefins are copolymers of one or more alpha-olefin with one or more non-hydrocarbon vinyl monomer. Examples of non-hydrocarbon vinyl monomers are vinyl acetate, ethyl acrylate, vinyl alcohol, vinyl chloride, and (meth)acrylic monomers.

Among non-hydrocarbon polyolefins, preferred hetero groups are carboxyl groups, ester groups, anhydride groups, alkoxysilane groups, and combinations thereof. More preferred are anhydride groups; more preferred is the product of grafting maleic anhydride onto a hydrocarbon polyolefin. Preferred hydrocarbon polyolefins onto which hetero groups may be grafted are preferably polyethylene or alpha-olefin homopolymers, more preferably polyethylene. An unsaturated compound containing a hetero atom may be grafted to a hydrocarbon polyolefin by any effective method, for example by a free radical method, for example in the presence of a free radical initiator or in the presence of ionizing radiation.

Some suitable non-hydrocarbon polyolefins include, for example, the AMPLIFY™ polymers, PARALOID™ functionalized ethylene-octene copolymers, and RETAIN™ polymers (available from The Dow Chemical Company). Additional examples include FUSABOND™ polymers (available from E.I. DuPont de Nemours), EXXELOR™ polymers (available from ExxonMobil Chemical Company), POLYBOND™ polymers (available from Chemtura Corporation), and LICOCENE™ polymers (available from Clariant International Ltd.).

The amount of non-hydrocarbon polyolefin in the initial polyolefin particles is, by weight based on the total solid weight of the dispersion of initial polyolefin particles, preferably 2% or more; more preferably 4% or more; more preferably 8% or more. The amount of non-hydrocarbon polyolefin in the initial polyolefin particles is, by weight based on the total solid weight of the dispersion of initial polyolefin particles, preferably 49.5% or less; more preferably 40% or less; more preferably 30% or less; more preferably 25% or less; more preferably 20% or less.

The dispersion of initial polyolefin particles additionally contains a crosslinking agent. Preferred crosslinking agents are chosen from polyolefins having carbon-carbon double bonds ("polyolefin crosslinking agents") and compounds having molecular weight of 500 or less and having two or more carbon-carbon double bonds ("monomer crosslinking agents"). Among polyolefin crosslinking agents, preferred are homopolymers and copolymers that contain polymerized units of one or more diene. Among monomer crosslinking agents, preferred are those with two or more carbon-carbon double bonds; more preferably 3 or more carbon-carbon double bonds. Suitable monomer crosslinking agents include triallyl isocyanurate and 1,3,5,7-tetravinyl-1,3,5,7-tetramethylcyclotetrasiloxane.

The amount of crosslinking agent is, by weight based on the total solid weight of the dispersion of initial polyolefin particles, preferably 0.5% or more; more preferably 1% or more; more preferably 1.5% or more. The amount of crosslinking agent is, by weight based on the total solid weight of the dispersion of initial polyolefin particles, preferably 20% or less; more preferably 15% or less.

The dispersion of initial polyolefin particles preferably contains one or more surfactant. Preferred surfactants are anionic surfactants, which have a hydrocarbon group of 8 or more carbon atoms and an anionic group. The hydrocarbon group may be linear, branched, aromatic, or a combination thereof; preferred are linear hydrocarbon groups. An anionic group is a chemical group that, in water at pH of 7, carries a negative charge. Preferred anionic groups are phosphate groups, phosphonate groups, carboxylate groups, sulfate groups, and sulfonate groups; more preferred are sulfate groups. Preferred anionic surfactants also contain the group —$(CH_2CH_2O)_n$—. When the group —$(CH_2CH_2O)_n$— is present, it is preferably bonded to the sulfate group. The index n is 1 or more, preferably 2 or more. The index n is preferably 20 or less; more preferably 15 or less; more preferably 10 or less; more preferably 6 or less; more preferably 4 or less; more preferably 3 or less.

The amount of surfactant in the initial polyolefin particles is, by weight based on the total solid weight of the dispersion, preferably 0.5% or more; more preferably 1% or more; more preferably 2% or more; more preferably 3% or more. The amount of surfactant in the initial polyolefin particles is, by weight based on the total solid weight of the dispersion, preferably 10% or less; more preferably 8% or less; more preferably 6% or less; more preferably 4% or less.

The initial polyolefin particles optionally contain one or more oil, one or more silicon-containing polymer (such as, for example, polydimethylsiloxane), or a mixture thereof.

Preferably, the total amount of the sum of hydrocarbon polyolefins, nonhydrocarbon polyolefins, crosslinking agents, and surfactants, by weight based on the total solids weight of the dispersion of initial polyolefin particles, is 40% or more; more preferably 50% or more; more preferably 60% or more; more preferably 70% or more; more preferably 80% or more; more preferably 90% or more; more preferably 95% or more.

The dispersion of initial particles in an aqueous medium may be formed by any method. One example of a suitable method is as follows. A hydrocarbon polyolefin and a non-hydrocarbon polyolefin are fed via a feed throat into an extruder. The hydrocarbon polyolefin and the non-hydrocarbon polyolefin may be added separately to the extruder; may be mixed together and then added to the extruder as a mixture; or may be compounded together by melt mixing prior to addition to the extruder. If a crosslinking agent is used that is solid at 25° C., then that crosslinking agent is also fed via the feed throat along with hydrocarbon polyolefin and non-hydrocarbon polyolefin. If a crosslinking agent is used that is liquid at 25° C., then that crosslinking agent is injected via a pump into the melt zone of the extruder. The polyolefins, including the crosslinking agent, are mixed together in the melt state in the extruder and then emulsified in the extruder by the addition of water and surfactant via pumps. The emulsion thus formed has solids level of 70% or higher. One method of making such an emulsion is taught in US 2016/0177077. Then further water is added to the extruder, and the final dispersion exiting the extruder has solids level of less than 70%.

Also contemplated is a method in which polyolefins are first emulsified as above, and then the crosslinking agent is added to the emulsion, preferably when the emulsion is held at a temperature above the melting point of one or more of the polyolefins.

A preferred method of making crosslinked particles contains a step of contacting the dispersion of initial polyolefin particles with a peroxide initiator. Peroxide initiators have the structure $R^1$—O—O—$R^2$, where $R^1$ and $R^2$ are each independently H or an organic group. Preferably $R^1$ and $R^2$ are each independently H or an alkyl group. Preferably $R^1$ and $R^2$ are not both H. Preferably $R^1$ is H. Preferably $R^2$ is an alkyl group with 2 or more carbon atoms; more preferably 3 or more carbon atoms, more preferably 4 or more carbon atoms. Preferably $R^2$ is an alkyl group with 12 or fewer carbon atoms; more preferably 10 or fewer carbon atoms; more preferably 8 or fewer carbon atoms; more preferably 6 or fewer carbon atoms; more preferably 4 or fewer carbon atoms.

Preferred peroxide initiators are water soluble. Preferred peroxide initiators are hydrogen peroxide and alkyl hydroperoxides; more preferred is t-butyl hydroperoxide.

Preferably, a reducing agent is also included to form a redox initiator with the peroxide. Preferred reducing agents are water soluble. Preferred reducing agents are ascorbic acid, isoascorbic acid, sodium formaldehyde sulfoxylate, tetramethyl ethylene diamine, sodium metabisulfites, and mixtures thereof; more preferred is isoascorbic acid. Preferably a catalyst for the oxidation/reduction reaction between the peroxide and the reducing agent is also included. Preferred catalyst is a salt of iron (II); more preferred is $FeSO_4$. Preferably the mole ratio of peroxide to reducing agent is 0.7:1 or higher; more preferably 0.8:1 or higher; more preferably 0.9:1 or higher. Preferably the mole ratio of peroxide to reducing agent is 1.3:1 or lower; more preferably 1.2:1 or lower; more preferably 1.1:1 or lower.

The amount of peroxide is preferably, by weight based on the total solid weight of the dispersion of initial polyolefin particles, 0.02% or more; more preferably 0.05% or more; more preferably 0.1% or more. The amount of peroxide is preferably, by weight based on the total solid weight of the dispersion of initial polyolefin particles, 2% or less; more preferably 1% or less; more preferably 0.5% or less. The mole ratio of reducing agent to peroxide is preferably 0.2:1 or higher; more preferably 0.5:1 or higher; more preferably 0.8:1 or higher. The mole ratio of reducing agent to peroxide is preferably 2:1 or lower; more preferably 1.5:1 or lower; more preferably 1.2:1 or lower. The amount of catalyst is, by weight based on the solid weight of the dispersion of initial polyolefin particles, preferably 1 ppm or more; more preferably 2 ppm or more; more preferably 4 ppm or more. The amount of catalyst is, by weight based on the solid weight of the dispersion of initial polyolefin particles, preferably 50 ppm or less; more preferably 20 ppm or less; more preferably 10 ppm or less.

While the invention is not limited to any specific mechanism, it is contemplated that the initiator generates free radical moieties that interact with the double bonds in the crosslinking agent and cause them to attach to polymer chains in the hydrocarbon polyolefin, thus creating crosslinks between polymer chains in the hydrocarbon polyolefin. This interaction is known herein as the crosslinking reaction. If a thermal initiator is used, it is expected that the dispersion will be heated to a temperature sufficiently high that the initiator will generate radicals for the crosslinking reaction. If a photoinitiator is used, it is expected that the dispersion will be exposed to radiation of sufficiently short wavelength and of sufficient intensity that the initiator will generate radicals for the crosslinking radicals. If a redox initiator is used, it is expected that the oxidation/reduction reaction will generate radicals for the crosslinking radicals. Redox initiators are preferred.

After the crosslinking reaction is complete, the particles in the dispersion are now referred to as crosslinked polyolefin particles. Preferably, the crosslinked polyolefin particles remain as a dispersion in the aqueous medium.

The crosslinked polyolefin particles preferably have Tg of 50° C. or lower; more preferably 30° C. or lower; more preferably 15° C. or lower; more preferably 0° C. or lower; more preferably −15° C. or lower.

Preferably, the volume average particle diameter of the crosslinked polyolefin particles is 100 nm or larger; more preferably 150 nm or larger; more preferably 200 nm or larger; more preferably 250 nm or larger. Preferably, the volume average particle diameter of the crosslinked polyolefin particles is 2000 nm or smaller; more preferably 1000 nm or smaller; more preferably 750 nm or smaller; more preferably 500 nm or smaller.

In the dispersion of crosslinked polyolefin particles, preferably the amount of water, by weight based on the weight of the aqueous medium, is 60% or more; more preferably 70% or more; more preferably 80% or more; more preferably 90% or more.

Preferably, the solids of the dispersion of crosslinked polyolefin particles is 20% or more; more preferably 25% or more; more preferably 30% or more; more preferably 35% or more. Preferably, the solids of the dispersion of crosslinked polyolefin particles is 60% or less; more preferably 55% or less; more preferably 50% or less; more preferably 45% or less.

The extent of crosslinking is assessed by measuring the gel fraction of the particles. The gel fraction is measured by drying the dispersion to remove the water, weighing the dry residue (weight=WTOT), then mixing the dry residue with toluene at 90° C. for 1 hour, then filtering the hot toluene through porous metal column fits of 75 μm pore size, as explained in detail in "method B" in the Examples below. The residual solid material not dissolved in the toluene is considered "gel" or crosslinked polymer. The gel fraction is the weight of dry gel (after removal of residual toluene) (weight=WGEL) divided by the weight of the total solid portion of the dispersion, expressed as a percentage. That is, $$\text{gel fraction}=100*WGEL/WTOT.$$

Preferably, the gel fraction is 5% or higher; more preferably 10% or higher; more preferably 15% or higher.

The dispersion of crosslinked polyolefin particles may be used for any purpose. A preferred purpose is as an ingredient in a process for making a dispersion of composite particles in an aqueous medium. A preferred process for making a dispersion of composite particles in an aqueous medium is to perform emulsion polymerization on one or more vinyl monomers in the presence of the dispersion of crosslinked polyolefin particles.

Preferably, one or more vinyl monomers are mixed with water and one or more surfactant to form an emulsion of droplets in an aqueous medium, where the droplets contain (meth)acrylic monomer. Preferably, a mixture is formed that contains a dispersion of crosslinked polyolefin particles in an aqueous medium, the emulsion of vinyl monomer droplets, and one or more water soluble initiator. The mixture is subjected to conditions that cause the initiator to produce radicals. Those conditions may be established at the same time the ingredients are mixed together, or those conditions may be established after some or all of the ingredients have been mixed together.

For example, the emulsion polymerization could be performed as a "batch" process. In a batch process, all of the desired dispersion of crosslinked polyolefin particles and all of the desired vinyl monomer(s) are mixed together. Then conditions are established to cause initiator to create radicals, for example by having a water-soluble thermal initiator present in the mixture and then heating the mixture, or by adding a redox initiator combination to the mixture. The radicals then initiate polymerization of the vinyl monomer in the presence of the crosslinked polyolefin particles.

A preferred emulsion polymerization method is "gradual addition." In a gradual addition process, all of the desired dispersion of crosslinked polyolefin particles are placed in a vessel. Then, one or more emulsion of vinyl monomer(s) are gradually added to the vessel, under conditions in which an initiator is producing radicals. In a preferred version of gradual addition, at the same time the one or more emulsion of vinyl monomers is being added, one or more water soluble initiators are also being added. If the water soluble initiator is a thermal initiator, the mixture in the vessel is preferably at a temperature sufficiently high to make the initiator produce radicals. If the water-soluble initiator is a redox initiator, preferably the various compounds of the redox initiator are simultaneously fed to the reactor gradually, preferably separately. In a gradual addition process, preferably the time from the addition of the first amount of monomer until the cessation of the addition of monomer is preferably 10 minutes or more; more preferably 20 minutes or more; more preferably 30 minutes or more; more preferably 40 minutes or more; more preferably 50 minutes or more.

Preferred vinyl monomers are (meth)acrylic monomers, vinyl aromatic monomers, and mixtures thereof; more preferred are (meth)acrylic monomers. Among (meth)acrylic monomers, preferred are (meth)acrylic acid, unsubstituted alkyl esters thereof, substituted-alkyl esters thereof, and mixtures thereof; more preferred are (meth)acrylic acid, unsubstituted alkyl esters thereof, and mixtures thereof; more preferred are unsubstituted alkyl esters of (meth)acrylic acid. Among unsubstituted alkyl esters of acrylic acid, preferred are those in which the alkyl group has 2 or more carbon atoms, more preferably 3 or more carbon atoms, more preferably 4 or more carbon atoms. Among unsubstituted alkyl esters of acrylic acid, preferred are those in which the alkyl group has 18 or fewer carbon atoms; more preferably 12 or fewer carbon atoms; more preferably 8 or fewer carbon atoms. Among unsubstituted alkyl esters of methacrylic acid, preferred are those in which the alkyl group has 4 or fewer carbon atoms; more preferably 3 or fewer carbon atoms; more preferably 2 or fewer carbon atoms; more preferably 1 carbon atom.

Optionally the vinyl monomers used in the emulsion polymerization contain one or more monofunctional monomer and one or more multifunctional monomer.

Preferably, the emulsion polymerization of vinyl monomer(s) forms a vinyl polymer that has a glass transition that is distinct from the glass transition of the crosslinked polyolefin particles. Preferably, the Tg of the vinyl polymer is higher than 50° C.; more preferably higher than 75° C.

Preferably, the vinyl polymer forms on the surfaces of the particles of crosslinked polyolefin. It is contemplated that the vinyl polymer forms a full or partial shell around particles of crosslinked polyolefin. The crosslinked polyolefin particle with a full or partial shell of vinyl polymer is called herein a composite particle. Preferably, at the conclusion of the emulsion polymerization process, the composite particles are dispersed in an aqueous medium. The crosslinked polyolefin particle is then referred to herein as the "core." The vinyl polymer formed during the emulsion polymerization is referred to herein as the "shell."

Preferably, the volume average particle diameter of the composite particles is 100 nm or larger; more preferably 150 nm or larger; more preferably 200 nm or larger; more preferably 250 nm or larger. Preferably, the volume average particle diameter of the composite particles is 2000 nm or smaller; more preferably 1000 nm or smaller; more preferably 750 nm or smaller; more preferably 500 nm or smaller.

In the dispersion of composite particles, preferably the amount of water, by weight based on the weight of the aqueous medium, is 60% or more; more preferably 70% or more; more preferably 80% or more; more preferably 90% or more.

Preferably, the solids of the dispersion of composite particles is 20% or more; more preferably 25% or more; more preferably 30% or more; more preferably 35% or more. Preferably, the solids of the dispersion of composite particles is 60% or less; more preferably 55% or less; more preferably 50% or less; more preferably 45% or less.

Preferably, the composite particles show two separate Tg's. It is expected that one Tg is a characteristic of the polyolefin core while the other Tg is a characteristic of the vinyl polymer shell. Preferably, the Tg of the polyolefin core is 50° C. or lower; more preferably 30° C. or lower; more preferably 15° C. or lower; more preferably 0° C. or lower; more preferably −15° C. or lower. Preferably, the Tg of the vinyl polymer shell is higher than 50° C.; more preferably 60° C. or higher; more preferably 70° C. or higher.

Preferably some of the vinyl polymer of the shell is grafted to the polyolefin core. That is, preferably, some of the polymer chains of the vinyl polymer shell are covalently attached to one or more of the polymer chains in the polyolefin core. The extent of grafting may be assessed using the method described below in the Examples. Preferably the amount of shell that is grafted to the core, by weight based on the total amount of the shell, is 40% or more; more preferably 50% or more; more preferably 60% or more; more preferably 70% or more; more preferably 80% or more; more preferably 90% or more.

The relative amounts of polyolefin core and vinyl polymer shell may be characterized by the weight of core, expressed as a percentage based on the sum of the weights of the core and the shell. The weight of the shell is deduced from the weight of all (meth)acrylic polymers added to the reaction vessel during emulsion polymerization. Preferably the amount of core is 95% or less; more preferably 92% or less; more preferably 87% or less. Preferably the amount of core is 60% or more; more preferably 70% or more; more preferably 77% or more.

Optionally, one or more buffer may be added to the dispersion of composite particles in order to adjust the pH of the dispersion.

A dispersion of composite particles according to the present invention may be used for any purpose. For some purposes, it is desirable to remove water from the dispersion and create a powder that contains the composite particles. Suitable methods for removing water from the dispersion of composite particles include, for example, spray drying and coagulation. When coagulation is used, it is preferably followed by subsequent drying methods including, for example, filtration, fluid bed drying, and combinations thereof. Preferably the process of removing water results in a powder in which the powder particles contain composite particles. It is expected that each particle in the powder will contain many composite particles. A powder particle will often contain 1000 or more composite particles.

The collection of powder particles optionally contains additional ingredients. Additional ingredients may be added to the dispersion and dried along with the composite particles, or additional ingredients may be added to the powder particles after the drying process. For example, one or more antioxidants or one or more process stabilizers or a combination thereof may be added to the collection of powder particles. Preferred process stabilizers contained in the collection of powder particles are phosphate salts; more preferred is sodium phosphate.

A powder that contains the composite particles of the present invention may be used for any purpose. One preferred use of such a powder is as an additive to a matrix polymer. Preferably, the powder that contains the composite particles of the present invention is mixed with powder or pellets of the matrix polymer, and the two ingredients, along with optional additional ingredients, are heated and mechanically blended, for example in an extruder. Preferably, the individual composite particles of the present invention become dispersed throughout a continuous phase of the matrix polymer.

The matrix polymer may be any type of polymer. Preferred matrix polymers are polycarbonates, polyvinyl chloride, nylon, polyurethane, natural rubber, synthetic rubber, polystyrene, (meth)acrylate polymers, polyesters, phenol-formaldehyde polymers, epoxies, polystyrene, copolymers of polystyrene, copolymers thereof, and blends thereof. Copolymers of polystyrene include, for example, styrene/acrylonitrile (SAN) and acrylonitrile/butadiene/styrene (ABS). Preferred are polycarbonates, polyvinyl chloride, polyesters, copolymers of polystyrene, and blends thereof. Blends include, for example, blends of polycarbonate with ABS and blends of polycarbonate with polyesters. More preferred are matrix polymers that comprise polycarbonate; more preferably matrix polymers that comprise polycarbonate in an amount, by weight based on the weight of the matrix polymer, of 20% or more; more preferably 40% or more; more preferably 60% or more; more preferably 80% or more; more preferably 90% or more; more preferably 95% or more. Some suitable matrix polymers are blends of polycarbonate with a copolymer of styrene, acrylonitrile, and butadiene; and blends of polycarbonate with a polyester such as, for example, butylene terephthalate.

In a composition that contains composite particles of the present invention and matrix polymer, the amount of composite particles is characterized as a weight percentage, based on the sum of the weights of the composite particles and the matrix polymer. Preferably, the amount of composite particles is 0.5% or more; more preferably 1% or more; more preferably 1.5% or more; more preferably 2% or more. Preferably, the amount of composite particles is 40% or less; more preferably 30% or less; more preferably 20% or less; more preferably 15% or less; more preferably 10% or less; more preferably 7% or less.

A composition containing matrix polymer and composite particles of the present invention is known herein as compounded matrix polymer. Optionally, additional ingredients in addition to the matrix polymer and the composite particles may be present in the compounded matrix polymer. Such additional ingredients may be added at any point in the process of making the compounded matrix polymer. For example, the process stabilizers described above as present in the powder form of the composite particles are optionally present in the compounded matrix polymer. Other process additional ingredients may be added during compounding (that is, when the composite particles are mixed with the matrix polymer). Additional ingredients suitable for addition during compounding include, for example process stabilizers (such as, for example, organic phosphates) and antioxidants.

When process stabilizers are present, preferably the amount of process stabilizer, by weight based on the weight of the compounded matrix polymer, is 0.05% or more; more preferably 0.1% or more. When process stabilizers are present, preferably the amount of process stabilizer, by weight based on the weight of the compounded matrix polymer, is 0.5% or less; more preferably 0.3% or less.

The following are examples of the present invention.

Test methods include the following: melt flow rate (MFR) was measured according to ISO 1133; Notched Izod Impact Strength was measured according to ASTM D256; yellowness index was measured according to ASTM E313.

The following materials were used:
Hydrocarbon Polyolefins:
  E/OCT-1=ENGAGE™ 8407 ethylene/octene copolymer from the Dow Chemical Company
  E/OCT-2=ENGAGE™ 8137 ethylene/octene copolymer from the Dow Chemical Company
  E/OCT-3=ENGAGE™ 8842 ethylene/octene copolymer from the Dow Chemical Company
Non-Hydrocarbon Polyolefins
  PE/MAH-1=LICOCENE™ PE MA 4351 maleated polyethylene wax, 5% maleic anhydride, from Clariant
  PE/MAH-2=RETAIN™ 3000 copolymer of ethylene/octene copolymer grafted with maleic anhydride groups, from the Dow Chemical Company
Crosslinking Agents
  EPDM=NORDEL™ 4820 ethylene-propylene-diene copolymer, from the Dow Chemical Company
  PBD=polybutadiene having high content of vinyl groups from Cray Valley
  TAIC=triallyl isocyanurate
Surfactants
  SLES=EMPICOL™ ESB 40 surfactant, sodium lauryl ether sulfate, from Huntsman.
  ETHOX=TERGITOL™ 15-S-20 surfactant, nonionic secondary alcohol ethoxylate, from the Dow Chemical Company.

In the samples described below, sample numbers beginning with "C" are comparative, and sample numbers beginning with "Ex" are working examples. Some working examples also serve as preparative examples of other embodiments.

PREPARATIVE EXAMPLE 1: MAKING AQUEOUS DISPERSION OF INITIAL POLYOLEFIN PARTICLES

An aqueous polyolefin dispersion was prepared utilizing a twin screw extruder (25 mm screw diameter, 48 L/D rotating at 450 rpm) using the following procedure. The hydrocarbon polyolefin and the non-hydrocarbon polyolefin were supplied to the feed throat of the extruder via a Schenck Mechatron loss-in-weight feeder and a Schenck volumetric feeder, respectively. The liquid crosslinking agent was injected into the polymer melt zone using Isco dual syringe pumps (from Teledyne Isco, Inc. (Lincoln, Nebr., USA)). The polymers were then melt blended, and then emulsified in the presence of a first aqueous stream and surfactant. The emulsion phase was then conveyed forward to the dilution and cooling zone of the extruder where additional dilution water was added to form the aqueous dispersions having solid level contents in the range of from less than 70 weight percent. The initial aqueous stream, and the dilution water were all supplied by Isco dual syringe pumps. The barrel temperature of the extruder was set to 140-150° C. After the dispersion exited the extruder, it was further cooled and filtered via a 200 μm mesh size bag filter. Particle size analysis was done with the Beckman Coulter LS 13320 Laser Light Scattering Particle Sizer (Beckman Coulter Inc., Fullerton, Calif.) using the standard procedure. Volume average particle size was obtained.

EXAMPLE 2: MAKING A DISPERSION OF CROSSLINKED POLYOLEFIN PARTICLES IN AN AQUEOUS MEDIUM

Crosslinked polyolefin particles were produced in a modified emulsion polymerization according to the following procedure. The polyolefin dispersion from Preparative Example 1 was diluted to 40 wt % solids with a pH of 4-7. Then 5 ppm $FeSO_4$ dissolved in water (based on polyolefin dispersion weight) was added into the dispersion prior to reaction. The dispersion was then charged into a 250 mL three-neck flask fitted with a condenser and a mechanical stirrer. The flask was placed in an oil bath at 65-100° C. The stirring rod was inserted through the Teflon adaptor and glass sleeve and connected to the center of the flask. The stirrer rate was set at 200 rpm. Nitrogen was slowly purged through the reactor, and cooling water was turned on to flow through the condenser. Redox initiator was tert-Butyl hydroperoxide (t-BuOOH) and a reducing agent. The reducing agent was isoascorbic acid (IAA) unless otherwise specified. The t-BuOOH and the reducing agent were dissolved in deionized water respectively and then fed into the reactor slowly using separate syringe pumps. Finally, the hybrid emulsion was collected by filtration through a 190 micron filter.

The gel fraction of the resulting dispersions were measured using two different methods. As defined above, in all methods, gel fraction=100*WGEL/WTOT. First, the dispersion was dried to remove water, and the weight of dried dispersion was WTOT.

In gel fraction method A, the dried sample of crosslinked polyolefin particles was extracted with xylene in a Soxhlet extractor for 18 hours under reflux. The dry weight of the material after extraction was WGEL.

In gel fraction method B, the dried sample of crosslinked polyolefin particles was stirred in toluene for 1 hour at 90° C. The mixture of solid material and toluene was filtered through a 75 μm filter. The weight of material retained on the filter, after drying, was WGEL.

The resulting crosslinked polyolefin particles are described in Table 1 below. The crosslinking reaction is characterized by reaction time (RXTIME) and reaction temperature (RXTEMP). The amounts of ingredients used are characterized as "phr," which is parts by weight based on 100 parts by weight of dry initial polyolefin particles.

TABLE 1

Making Crosslinked Polyolefin Particles

|  | C1 | C2 | Ex. 1 | Ex. 2 | Ex. 3 | Ex. 4A | Ex. 5 | Ex 4B | Ex 4C |
|---|---|---|---|---|---|---|---|---|---|
| E/OCT-1 | 81 | 72 | 72 | 72 |  |  |  |  |  |
| E/OCT-2 |  |  |  |  | 67.5 | 75 | 75 | 75 | 75 |
| PE/MAH-1 | 15 | 15 | 15 | 15 |  |  | 5 | 5 | 5 |
| PE/MAH-2 |  |  |  |  | 15 | 10 | 10 | 10 | 10 |
| EPDM |  | 8 | 8 | 8 | 13.5 |  |  |  |  |
| PBD |  |  |  |  |  |  | 2 |  |  |
| TAIC |  |  |  |  |  | 2 |  | 2 | 2 |
| SLES | 4 | 4 | 4 | 4 | 4 | 4 | 4 | 4 | 4 |
| Peroxide (phr) | 0.8 | 0 | 0.4 | 0.8 | 0.8 | 0.3[a] | 0.3 | 0.3[b] | 0.3[c] |
| RXTIME (h) | 4 | 0 | 2 | 4 | 3 | 1 | 1 | 1 | 1 |
| RXTEMP (° C.) | 95 | — | 95 | 95 | 95 | 65 | 65 | 65 | 65 |

[a]t-BuOOH/sodium formaldehyde sulfoxylate (SFS) redox pair
[b]hydrogen peroxide/isoascorbic acid (IAA) redox pair
[c]tert-butyl peroctoate/SFS redox pair C1 is comparative because no crosslinking agent was used. C2 is comparative because the initial polyolefin particles were not subjected to the crosslinking reaction with peroxide.

The crosslinked polyolefin particles were characterized, as shown in Table 2 below, using methods described above. The gel fraction ("gel frac") was characterized by method A or method B or both. The diameter ("diam") was measured as described above. The notation "nm" means "not measured."

TABLE 2

Characterizing Crosslinked Polyolefin Particles

|  | C1 | C2 | Ex. 1 | Ex. 2 | Ex. 3 | Ex. 4A | Ex. 5 | Ex 4B | Ex 4C |
|---|---|---|---|---|---|---|---|---|---|
| gel frac A (%) | 0 | 0 | 31 | 34 | 51 | nm | nm | nm | nm |
| gel frac B (%) | nm | nm | nm | nm | 36 | 87 | 60[1] | 12 | 36 |
| diam (nm) | 335 | 335 | 335 | 335 | 408 | 335 | 335 | 335 | 335 |

[1]approximately

The comparative samples had no gel fraction, while the working examples had significant level of crosslinked material.

Additional initial polyolefin particles were made and then crosslinked by the methods described above. Compositions were as shown in Table 3. Crystallinity was measured by DSC, at a scan rate of 10° C./minute, using the area under the crystallization exotherm. The terms "low" and "medium" are comparative terms to compare samples within Table 3, as follows: "low" means crystallization exotherm less than or equal to 30 J/gram; and "medium" means crystallization exotherm above 30 J/gram but less than or equal to 45 J/gram.

TABLE 3

Making Additional Initial Polyolefin Particles

|  | Ex. 6 | Ex. 7 | Ex. 8 | Ex.9 |
|---|---|---|---|---|
| E/OCT-2 | 67.5 | 67.5 |  | 79 |
| E/OCT-3 |  |  | 79 |  |

TABLE 3-continued

Making Additional Initial Polyolefin Particles

|  | Ex. 6 | Ex. 7 | Ex. 8 | Ex.9 |
|---|---|---|---|---|
| PE/MAH-1 | 15 | 5 | 5 | 5 |
| PE/MAH-2 |  | 10 | 10 | 10 |
| EPDM | 13.5 | 13.5 |  |  |
| TAIC |  |  | 2 | 2 |
| SLES | 4 | 4 | 4 | 2 |
| ETHOX |  |  |  | 2 |
| crystallinity | medium | low | low | low |
| diam (nm) | 299 | 340 | 326 | 434 |

The initial polyolefin particles described in Table 3 were crosslinked using the methods described above. The resulting compositions were as shown in Table 4. The suffix "X" denotes the result of the crosslinking reaction. The label "gel frac" refers to the gel fraction in the crosslinked polyolefin particle, measured by method "B" defined above. All of the samples labeled "Ex" had sufficient crosslinking to qualify as working examples of the present invention. "diam" is the volume-average diameter of the crosslinked polyolefin particle prior to emulsion polymerization.

TABLE 4

Characteristics of Crosslinked Polyolefin Particles

|  | Ex 6X | Ex 7X | Ex 8X | Ex 9X |
|---|---|---|---|---|
| initial PO particle | Ex 6 | Ex 7 | Ex 8 | Ex 9 |
| gel fraction | 20[(1)] | 35 | 68[(2)] | 45 |

[(1)]Approximately
[(2)]Two samples were measured: both had either 68% or higher.

EXAMPLE 3: EMULSION POLYMERIZATION

Composite particles were prepared by a seeded emulsion polymerization process. Each of the above crosslinked polyolefin particle dispersions of Table 4 was placed into a reactor to be used as a seed for polymerization of acrylic monomers. The monomers were premixed to form a monomer emulsion and then injected into the reactor over 60 min at 65° C. At the same time, a redox catalyst pair was fed separately into the reactor as a free radical initiator over 90 min. The reaction was maintained at 60° C. for 90 min and then allowed to cool to 25° C. and filtered through a 190 μm filter. In all cases the acrylic monomers were a mixture of methyl methacrylate (MMA) and butyl acrylate (BA), in a weight ratio of MMA:BA of 98.0:2.0.

The characterization of the composite particles after emulsion polymerization is shown below in Table 5.

Grafting was assessed as follows. Samples (approximately 0.2 gram) were dissolved in 5 g of tetrahydrofuran (THF) for approximately 16 hours at room temperature (approximately 23° C.). Then 5 g of acetonitrile (ACN) was added to the solution, which then stood for approximately 16 hours at room temperature. The solution was centrifuged at 70,000 revolutions per minute for 15 min. The supernatant was filtered and tested in a size exclusion chromatograph (SEC) apparatus, using styrene-divinylbenzene copolymer beads, flowing THF at 1 mL/min, with column temperature of 40° C., and differential refractive index detection. The extracted polymer was assumed to be ungrafted acrylic copolymer p(MMA/BA). The SEC curves of detector response versus time for each sample were compared to SEC curves for p(MMA/BA) standard samples of known concentrations. The graph of peak area vs. concentration for the p(MMA/BA) standard samples was fit to a standard line by the linear least-squares method. Using that standard line, the SEC peak area for each sample was converted to a concentration, which was used to calculate the amount of extractable polymer from each sample.

In Table 5, the label "PO disp" refers to the polyolefin dispersion, defined in Table 4, that was used as seed for the emulsion polymerization. The suffix "-S" refers to the result of emulsion polymerization in the presence of a polyolefin dispersion. "Core: Shell" is the weight ratio of dry crosslinked polyolefin particles to total weight of (meth)acrylic monomers used. In some samples, $Na_3PO_4$ was added to the polyolefin dispersion prior to emulsion polymerization, and the amount shown is weight % based on the weight of the solid polyolefin particles.

TABLE 5

Characterization of Composite Particles

|  | Ex. 6S | Ex. 7S | Ex. 8AS | Ex. 8BS | Ex. 9S | C 7S |
|---|---|---|---|---|---|---|
| PO-disp | 6X | 7X | 8X | 8X | 9X | C 7 |
| grafting | medium | medium | high | high | high | medium |
| Core:Shell | 85:15 | 83:17 | 80:20 | 83:17 | 83:17 | 83:17 |
| diam (nm) | 299 | 340 | 326 | 326 | 434 | 340 |
| $Na_3PO_4$ (%) | 0 | 0 | 0.5 | 0.5 | 0.5 | 0.5 |

In Comparative C 7S, emulsion polymerization was performed on the non-crosslinked dispersion of initial polyolefin particles C 7.

EXAMPLE 4: COMPOUNDING OF COMPOSITE PARTICLES WITH MATRIX POLYMER

The aqueous dispersions of composite particles were spray dried according to the following procedure. A two-fluid nozzle atomizer was equipped on a Mobile Minor spray dryer (GEA Process Engineering Inc. (Copenhagen, Denmark)). The nitrogen pressure to nozzle was fixed at 1 bar with 50% flow which is equivalent to 6.0 kg/hour of air flow. A glass jar was placed under the cyclone with the valve on the bottom of the cyclone open. Olefin-acrylic dispersion (approximately 40 wt % solid) was pumped into the heated chamber by an emulsion feed pump. The spray drying experiment was conducted in Na environment with an inlet temperature fixed at 120° C., and the outlet temperature was controlled at 40° C. by tuning the feed rate of the dispersion. The volume mean particle diameter of the dry powder was measured to be in the range of 20-40 μm.

The polycarbonate (PC) used was MAKROLON™ 2405 resin from Covestro. Before compounding, the resin was thoroughly dried for 2-4 hours at 110° C. in an oven. The polycarbonate (PC) resin and the composite particles were compounded with a JSW TEX28V co-rotating twin screw extruder (L/D=42). The resin and the composite particles were supplied to the feed throat of the extruder via the gravimetric K-Tron feeders and then melt blended. The extruded strand was then cooled and pelletized with a granulometer. The temperature profile of the extruder was set as 25-260-270-280-285-280-280-280-280-280-280-280-280° C. (from the hopper to the die) and the compounding was done with a screw speed of 150 rpm and an output of 10 kg/hr.

The compounded pellets were dried 4 hours at 110° C. in a low pressure dryer and injection molded utilizing the Battenfield HM80/120 machine with the following temperature profile: 280-280-285-290° C. (from the hopper to the die). The holding pressure was set as 200 bars and the mold temperature was 80° C. The molds were ejected after a cooling time of 40 secs.

The modifier materials compounded with the PC resin were the composite particles described above and, for comparison, PARALOID™ EXL-2629J methacrylate butadiene styrene impact modifier from the Dow Chemical Company, (herein "MBS").

EXAMPLE 5: EXPERIMENTAL RESULTS WITH MODIFIER IN POLYCARBONATE

Samples were compounded and molded as described in Example 4 above, with 95% by weight PC and 5% by weight various modifiers. The results of the MFR and the Izod impact tests at various temperatures were as shown in Table 6. "nt" means not tested. The conditions for MFR were 300° C. with 1.2 kg load. The amounts of modifier shown are percent by weight based on the total weight of the compounded PC. "Gate Defect" refers to the presence of surface delamination in the injection molded bar. Asterisk (*) denotes comparative example.

TABLE 6

Results with 2.5% modifier in PC.
Izod results in units of J/cm (ft * lb/in).

| Modifier: | none* | MBS* | Ex. 7S | Ex. 8BS |
|---|---|---|---|---|
| MFR (g/10 mm) | 20 | 20.3 | 19.6 | 22.8 |
| Izod at 23° C. | 7.0 (13.2) | 6.7 (12.5) | 6.8 (12.8) | 6.7 (12.6) |
| Izod at 0° C. | 6.5 (12.2) | 6.0(11.2) | 6.7 (12.5) | 6.5 (12.2) |
| Izod at −20° C. | 3.5 (6.5) | 5.6 (10.4) | 5.0 (9.3) | 6.1 (11.5) |
| Izod at −30° C. | 1.5 (2.8) | 3.3 (6.2) | 2.4 (4.5) | 5.2 (9.7) |
| Gate Defect | no | no | low | no |

As shown in Table 6, the compounds with modifier show acceptable MFR results. The compounds with modifier show equivalent Izod impact with the non-modified PC at 23° C. and 0° C., and the compounds with modifier show improved Izod impact at −20° C. and −30° C. The modifiers of the present invention (Ex. 7S and Ex. 8BS) show improvement to Izod impact that is equivalent to the improvement given by the commercial MBS impact modifier. It is known that MBS modifiers tend to degrade relatively quickly upon exposure outdoors because of the prevalence of unsaturated polybutadiene and aromatic rings in the MBS composition. In contrast, the modifiers of the present invention are expected to resist degradation due to outdoor exposure because of their polyolefin composition, which has few or no aromatic rings or unsaturations.

TABLE 7

Results with 5% modifier in PC. Izod results in units of J/cm (ft*lb/in).

| Modifier: | MBS* | Ex 6S | C 7S* | Ex 7S | Ex 8AS | Ex 9S |
|---|---|---|---|---|---|---|
| MFR (g/10 min) | 17.9 | 19.4 | 25.5 | 20.7 | 20.8 | 20.3 |
| Izod at 23° C. | 6.1 (11.5) | 6.1 (11.4) | nt | 6.7 (12.5) | 6.5 (12.2) | 6.4 (12.0) |
| Izod at 0° C. | 5.5 (10.3) | 5.8 (10.9) | 6.0 (11.2) | 6.4 (11.9) | 6.3 (11.8) | 5.9 (11.1) |
| Izod at −20° C. | 5.7 (10.7) | 5.7 (10.7) | 5.7 (10.7) | 5.8 (11.0) | 5.5 (10.2) | 5.8 (10.8) |
| Izod at −30° C. | 5.2(9.8) | 3.1 (5.8) | 3.1 (5.9) | 3.0 (5.6) | 5.7 (10.6) | 4.8 (9.0) |
| Gate Defect | no | high | high | low | no | no |

The modifiers of the present invention all gave acceptable MFR and Izod impact results. Example 6S had the lowest level of crosslinking in the crosslinked polyolefin particles prior to emulsion polymerization, and that Example had the least desirable outcome for Gate Defect, among the modifiers of the present invention.

The invention claimed is:

1. A process for making a dispersion of composite particles comprising
   (i) providing a dispersion of crosslinked polyolefin particles in an aqueous medium, wherein the crosslinked polyolefin particles have a gel fraction of 10% or more by weight, wherein the gel fraction is measured in toluene at 90° C. for 1 hour, and are formed by emulsion polymerization of an ethylene/octene copolymer and an ethylene/octene copolymer grafted with maleic anhydride groups in the presence of a crosslinking agent and a redox initiator,
   (ii) performing emulsion polymerization on one or more vinyl monomers in the presence of the crosslinked polyolefin particles to produce the dispersion of composite particles.

2. The process of claim 1, wherein the vinyl monomer comprises one or more (meth)acrylic monomers.

3. The process of claim 1, wherein the vinyl monomer comprises one or more unsubstituted alkyl ester of (meth)acrylic acid.

4. The process of claim 1, wherein the crosslinked polyolefin particles have Tg of −30° C. or lower.

5. The process of claim 1, wherein the crosslinked polyolefin particles are used in an amount of 60% to 90% by weight based on the sum of the weight of the crosslinked polyolefin particles and the total weight of vinyl monomer.

6. The process of claim 1, wherein the emulsion polymerization step is performed as a gradual addition process, wherein the time from the addition of the first amount of monomer until the cessation of addition of monomer is 0 minutes or more.

7. The process of claim 1, wherein the composite particles comprise polyolefin core and a vinyl shell.

8. The process of claim 7, wherein at least a portion of vinyl monomers polymerized in step (ii) are covalently attached to one or more chains in the polyolefin core.

9. The process of claim 8, at least 40% of the vinyl monomers by weight based on the total amount of the shell are covalently attached to one or more chains in the polyolefin core.

* * * * *